United States Patent
Singhal et al.

(10) Patent No.: US 12,034,881 B2
(45) Date of Patent: Jul. 9, 2024

(54) METHODS AND SYSTEMS FOR RULE BASED CHARGING FOR INTERNET OF THINGS (IoT) SUPPORT

(71) Applicant: Telefonaktiebolaget LM Ericsson (publ), Stockholm (SE)

(72) Inventors: Sumit Singhal, Karlskrona (SE); Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 17/436,697

(22) PCT Filed: Mar. 4, 2019

(86) PCT No.: PCT/EP2019/055287
§ 371 (c)(1),
(2) Date: Sep. 7, 2021

(87) PCT Pub. No.: WO2020/177852
PCT Pub. Date: Sep. 10, 2020

(65) Prior Publication Data
US 2022/0131980 A1    Apr. 28, 2022

(51) Int. Cl.
*H04M 15/00* (2024.01)
*G16Y 10/75* (2020.01)
(Continued)

(52) U.S. Cl.
CPC ............ *H04M 15/64* (2013.01); *G16Y 10/75* (2020.01); *H04L 12/1403* (2013.01); *H04M 15/66* (2013.01); *H04W 4/24* (2013.01)

(58) Field of Classification Search
CPC ...... H04M 15/64; H04M 15/66; G16Y 10/75; H04L 12/1403; H04W 4/24
See application file for complete search history.

(56) References Cited

U.S. PATENT DOCUMENTS

| | | | |
|---|---|---|---|
| 2016/0226668 A1* | 8/2016 | Zhang | H04W 4/24 |
| 2020/0162619 A1* | 5/2020 | Zevallos | H04L 12/1407 |
| 2020/0236515 A1* | 7/2020 | Zevallos | H04W 4/70 |

FOREIGN PATENT DOCUMENTS

WO    2018154356 A1    8/2018

OTHER PUBLICATIONS

Author Unknown, "Technical Specification Group Services and System Aspects; Telecommunication management; Charging architecture and principles (Release 15)," Technical Specification 32.240, Version 15.4.0, 3GPP Organizational Partners, Dec. 2018, 60 pages.

(Continued)

*Primary Examiner* — Khai M Nguyen
(74) *Attorney, Agent, or Firm* — Withrow & Terranova, PLLC

(57) ABSTRACT

Systems and methods are provided for charging for resource usage by an Internet of Things (IoT) device. The method includes: creating a subscription for the IoT device; estimating, based at least in part on the subscription, a number of event notifications associated with resource usage by the IoT device expected over a period of time; transmitting a first message including the number of estimated event notifications associated with resource usage by the IoT device expected over the period of time towards an Online Charging System (OCS); and transmitting a second message including an actual number of event notifications associated with resource usage by the IoT device over the period of time towards the OCS.

21 Claims, 10 Drawing Sheets

(51) Int. Cl.
    *H04L 12/14*     (2006.01)
    *H04W 4/24*     (2018.01)

(56) References Cited

OTHER PUBLICATIONS

Author Unknown, "Technical Specification Group Services and System Aspects; Telecommunication management; Charging management; Diameter charging applications (Release 15)," Technical Specification 32.299, Version 15.5.0, 3GPP Organizational Partners, Dec. 2018, 206 pages.

Hakala, Harri, et al., "Diameter Credit-Control Application," Internet Engineering Task Force (IETF), Network Working Group, Request for Comments: 4006, Aug. 2005, 114 pages.

Jin, Yichao, et al., "Content centric routing in IoT networks and its integration in RPL," Computer Communitcations, vols. 89-90, Sep. 1, 2016, pp. 87-104.

International Search Report and Written Opinion for International Patent Application No. PCT/EP2019/055287, mailed Nov. 25, 2019, 16 pages.

* cited by examiner

METHODS AND SYSTEMS FOR RULE BASED CHARGING FOR INTERNET OF THINGS (IoT) SUPPORT

This application is a 35 U.S.C. § 371 national phase filing of International Application No. PCT/EP2019/055287, filed Mar. 4, 2019, the disclosure of which is incorporated herein by reference in its entirety.

TECHNICAL FIELD

The present invention generally relates to communication networks and, more particularly, to rule based charging for use in an Internet of Things (IoT) environment.

BACKGROUND

Over time the number of products and services provided to users of telecommunication products has grown significantly. For example, in the early years of wireless communication, devices could be used for conversations and later also had the ability to send and receive text messages. Over time, technology advanced and wireless phones of varying capabilities were introduced which had access to various services provided by network operators, e.g., data services, such as streaming video or music service. This includes devices, e.g., so called "smart" phones and tablets, which can access communication networks in which the operators of the networks, and other parties, provide many different types of services, applications, etc. More recently, the Internet of Things (IoT) and Machine-Type communication (MTC) have been introduced.

The IoT may be considered as an evolving concept for the current and future world where everything that may benefit from a data connection may be connected. Radio technologies are being developed to enable, as well as enable more efficiently, the IoT world. MTC is a form of data communication which involves one or more entities that do not necessarily need human interaction. For the purposes of this description, IoT devices and IoT servers include MTC devices and MTC servers. For example, IoT devices can be wireless devices which may communicate through a Public Land Mobile Network (PLMN) with IoT server(s) and/or other IoT devices. The IoT server also has an interface which may be accessed by an IoT User. The IoT server performs services for the IoT user. An IoT user may use the service provided by the IoT server. IoT devices, may be home and/or building automation devices, alarms, emission control devices/systems, toll payment devices, people tracking device, parcel tracking devices, sensors or sensor networks, industrial automation devices, personal network devices, meters, appliances, etc.

However, in this IoT environment, the existing systems and methods for communicating between the various devices and interfaces, including an IoT service layer, IoT core network and an Online Charging System (OCS) are not efficient, particularly in view of the expected volume of potential signaling traffic. This inefficiency is because, at least in part, the pattern of service consumption by an IoT device is different from the way services are consumed by a typical $3^{rd}$ Generation Partnership Project (3GPP) user equipment (UE) as the 3GPP UE is typically a handheld device and thus human interface driven.

FIG. 1 shows a signaling diagram 100 for a single device for a single service request using conventional methods. FIG. 1 includes an end user 102 (operating some type of device), a service element 104, e.g., a credit control client, a Diameter Authentication, Authorization and Accounting (AAA) Server 106 and a Credit Control (CC) server 108. Initially, the end user 102 sends a service request 110 to the service element 104. The service element 104 then transmits a credit control request (CCR) message 112 associated with an event to the AAA server 106 which forwards CCR message 112 as CCR message 114 associated with the event to the CC server 108. The CC server 108, which is part of an Online Charging System (OCS), grants the request and transmits a credit control authorized (CCA) message 116, which includes the granted units, to the AAA server 106. The AAA server 106 then transmits the information as CCA message 118 with the granted units to the service element 104. The service element 104 transmits a service delivery message 120 to the end user 102.

Now considering the above example in the IoT environment, suppose the example associated with FIG. 1 describes a single subscription for an IoT device. As per the subscription, the IoT device is to send a notification to the IoT service layer every one hour notifying the IoT service layer the current value of the sensor, e.g., a temperature sensor. This means that there will be a temperature sensor value notification promulgating through the network at every +1, +2, +3, etc., hours, based on the timestamp associated with subscription creation, to the IoT Service Layer. Now, if the notifications generated by the IoT device are chargeable using the method of FIG. 1, the IoT service layer will transmit twenty-four such CCR events in a day to the CC server 108 for charging these events. This problem grows greatly in scale when millions or billions of such IoT devices exist creating many Diameter signaling messages, e.g., CCR and CCA messages, between the IoT service layer and the OCS for the chargeable notification events as sent by the IoT device.

It is expected that the number of IoT devices deployed is going to grow several fold compared to 3GPP UE deployment in the coming years. Accordingly, the existing infrastructure and communication methods would therefore result in too much signaling between IoT devices, an IoT core network, an IoT service layer and the OCS.

Thus, there is a need to provide methods and systems that overcome the above-described drawbacks associated with signaling in the IoT environment.

SUMMARY

Embodiments allow for understanding the periodic nature of the service consumption pattern of Internet of Things (IoT) devices and using that understanding to optimize a charging interface between an Online Charging System (OCS) and an IoT Service Layer/IoT Access Network. This allows for a reduction in overall signaling in the system by allowing, for example, a single signal to represent a plurality of chargeable events.

According to an embodiment, there is a method for charging for resource usage by an Internet of Things (IoT) device, the method comprising: creating a subscription for the IoT device; estimating, based at least in part on the subscription, a number of event notifications associated with resource usage by the IoT device expected over a period of time; transmitting a first message including the number of estimated event notifications associated with resource usage by the IoT device expected over the period of time towards an Online Charging System (OCS); and transmitting a second message including an actual number of event notifications associated with resource usage by the IoT device over the period of time towards the OCS.

According to an embodiment, there is a communication node for charging for resource usage by an Internet of Things (IoT) device, the communication node comprising: a processor configured to create a subscription for the IoT device; the processor configured to estimate, based at least in part on the subscription, a number of event notifications associated with resource usage by the IoT device expected over a period of time; a communication interface configured to transmit a first message including the number of estimated event notifications associated with resource usage by the IoT device expected over the period of time towards an Online Charging System (OCS); and the communication interface configured to transmit a second message including an actual number of event notifications associated with resource usage by the IoT device over the period of time towards the OCS.

According to an embodiment, there is a computer-readable storage medium containing a computer-readable code that when read by a processor causes the processor to perform a method for charging for resource usage by an Internet of Things (IoT) device comprising: creating a subscription for the IoT device; estimating, based at least in part on the subscription, a number of event notifications associated with resource usage by the IoT device expected over a period of time; transmitting a first message including the number of estimated event notifications associated with resource usage by the IoT device expected over the period of time towards an Online Charging System (OCS); and transmitting a second message including an actual number of event notifications associated with resource usage by the IoT device over the period of time towards the OCS.

According to an embodiment, there is a method for charging for resource usage of an IoT device, wherein the charging is performed by an Online Charging System (OCS), the method comprising: receiving a first message including a number of estimated event notifications associated with resource usage by the IoT device expected over a period of time; storing information associated with the number of estimated event notifications associated with resource usage by the IoT device expected over the period of time; charging for the number of estimated event notifications associated with resource usage by the IoT device expected over the period of time; and receiving a second message including an actual number of event notifications associated with resource usage by the IoT device over the period of time.

According to an embodiment, there is an Online Charging System (OCS) node configured to charge for resource usage of an Internet of Things (IoT) device, the OCS node comprising: a communication interface configured to receive a first message including a number of estimated event notifications associated with resource usage by the IoT device expected over a period of time; a memory configured to store information associated with the number of estimated event notifications associated with resource usage by the IoT device expected over the period of time; a processor configured to charge for the number of estimated event notifications associated with resource usage by the IoT device expected over the period of time; and the communication interface configured to receive a second message including an actual number of event notifications associated with resource usage by the IoT device over the period of time.

According to an embodiment, there is a computer-readable storage medium containing a computer-readable code that when read by a processor causes the processor to charge for resource usage of an Internet of Things (IoT) device, wherein the charging is performed by an Online Charging System (OCS), comprising: receiving a first message including a number of estimated event notifications associated with resource usage by the IoT device expected over a period of time; storing information associated with the number of estimated event notifications associated with resource usage by the IoT device expected over the period of time; charging for the number of estimated event notifications associated with resource usage by the IoT device expected over the period of time; and receiving a second message including an actual number of event notifications associated with resource usage by the IoT device over the period of time.

According to an embodiment, there is an apparatus adapted to create a subscription for the IoT device; to estimate, based at least in part on the subscription, a number of event notifications associated with resource usage by the IoT device expected over a period of time; to transmit a first message including the number of estimated event notifications associated with resource usage by the IoT device expected over the period of time towards an Online Charging System (OCS); and to transmit a second message including an actual number of event notifications associated with resource usage by the IoT device over the period of time towards the OCS.

According to an embodiment, there is an apparatus adapted to receive a first message including a number of estimated event notifications associated with resource usage by the IoT device expected over a period of time; to store information associated with the number of estimated event notifications associated with resource usage by the IoT device expected over the period of time; to charge for the number of estimated event notifications associated with resource usage by the IoT device expected over the period of time; and to receive a second message including an actual number of event notifications associated with resource usage by the IoT device over the period of time.

According to an embodiment, there is an apparatus comprising: a first module configured to create a subscription for the IoT device; a second module configured to estimate, based at least in part on the subscription, a number of event notifications associated with resource usage by the IoT device expected over a period of time; a third module configured to transmit a first message including the number of estimated event notifications associated with resource usage by the IoT device expected over the period of time towards an Online Charging System (OCS); and a fourth module configured to transmit a second message including an actual number of event notifications associated with resource usage by the IoT device over the period of time towards the OCS.

According to an embodiment, there is an apparatus comprising: a first module configured to receive a first message including a number of estimated event notifications associated with resource usage by the IoT device expected over a period of time; a second module configured to store information associated with the number of estimated event notifications associated with resource usage by the IoT device expected over the period of time; a third module configured to charge for the number of estimated event notifications associated with resource usage by the IoT device expected over the period of time; and a fourth module configured to receive a second message including an actual number of event notifications associated with resource usage by the IoT device over the period of time.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background section, there are problems associated the expected volume of signaling in an Internet of Things (IoT) environment, particularly when using conventional signaling techniques. Embodiments can use the pattern of service consumption by a typical IoT device to optimize the signaling towards an Online Charging System (OCS) in order to efficiently use network infrastructure resources. The periodic nature of service usage by many IoT devices can help in optimizing the charging related to signaling by provisioning charging rules in the OCS. Thus, according to embodiments, much of the potential signaling can be avoided when services are consumed as per predefined periods. Prior to discussing embodiments in detail, an overview of an IoT deployment is now described with respect to FIG. 2.

Figure 2:
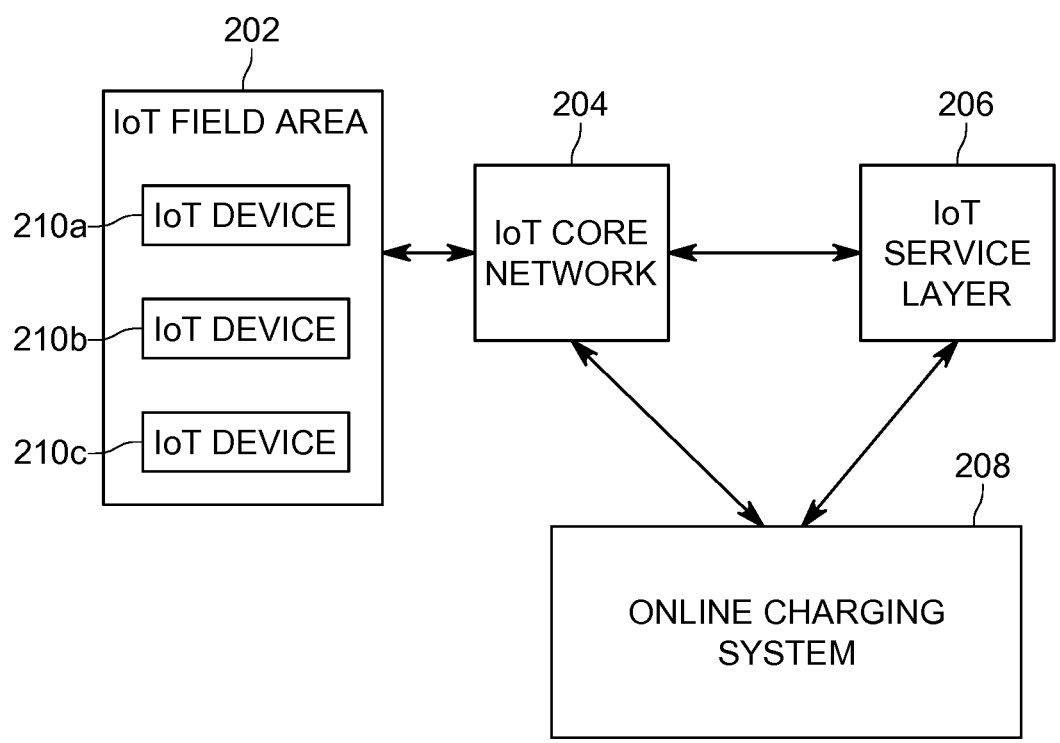
FIG. 2 shows an Internet of Things (IoT) deployment according to an embodiment.

According to an embodiment, FIG. 2 shows an IoT deployment which includes IoT field area 202 which includes a plurality of IoT devices 210a, 210b and 210c, an IoT core network 204, an IoT service layer 206 and an OCS 208. In this example, the IoT devices 210a, 210b and 210c each include (or are) one or more sensors that are responsible for reporting sensed readings back to the IoT service layer 206 via the IoT core network 204. The reporting time frame can be ongoing with a specified periodicity, on demand, a combination of both or some other reporting time frame. The IoT field area 202 can be, for example, a smart home or smart car where several IoT devices 210a, 210b and/or 210c, e.g., sensors, are deployed. The IoT core network 204 includes the access and core nodes that support the network layer for IoT field area 202 and IoT service layer 206 communication.

For a typical telecommunications operator which plans to leverage existing telecommunication infrastructure for IoT needs, the IoT core network 204 may include the resources currently available in the access and core networks responsible for support of service establishment. Alternatively, the IoT core network 204 may include other resources, e.g., resources associated with the rollout of 5G. The IoT core network 204 can also interface with the OCS 208 in support of charging needs. The IoT service layer 206 is the service layer that acts as the application layer in the IoT setup. The IoT service layer 206 can include interfaces towards the consumer of the IoT services and the IoT service layer 206 can also interface with the OCS 208 for charging needs.

As described above, IoT supported devices are being rolled out and will continue to be used in society in the future. For example, IoT devices can be deployed while being able to be used in current technologies, e.g., 3G and Long Term Evolution (LTE) networks, as well as being optimized for use in future networks, e.g., 5G networks. 5G-New radio (NR) is a new radio access technology currently being standardized in the $3^{rd}$ Generation Partnership Project (3GPP). One characteristic of 5G NR is the so-called "ultra-lean design principle" in which the amount of mandatory broadcast signals that must always be transmitted is expected to be significantly reduced compared to LTE. 5G-NR is further designed to better support high gain and dynamic beamforming as well as support operation in higher frequency band(s) compared to LTE.

Although the so-called fifth generation of mobile telecommunications and wireless technology is not yet fully defined, it is in a relatively advanced draft stage. Accordingly, it will be appreciated that LTE terminology is used in some embodiments, the description of which embodiments also apply to equivalent 5G entities or functionalities despite the terminology used. In other embodiments specific 5G examples are provided.

As previously described, traditional telecommunication and charging systems are defined to support the service consumption by the 3GPP user equipment (UE). These UEs are typically handheld devices and thus human interactions are the key drivers in the manner in which voice, data and other services are consumed. However, in an IoT environment, there is a greatly reduced amount of human interactions involved with IoT devices consuming services and thus, more or less, networks function as automated networks. Also, the kind or type of service supported on the IoT devices, although varied in nature depending upon the IoT device functionality, are usually somewhat limited. While a traditional telecommunication network is dependent on human usage pattern(s), an IoT network in its automated form is much more predictable and/or deducible in terms of usage pattern(s).

An IoT network can be setup with subscriptions associated with an IoT device 210a, 210b and/or 210c by the IoT service layer 206. These subscriptions are input in order to inform the IoT device 210a, 210b and/or 210c that the IoT service layer 206, or a consumer which input the subscription, is interested in learning the change in values of a particular resource and that these changes can be notified over a fixed interval of time. Such subscriptions can be implemented using a subscribe-notify mechanism that operates in the IoT network. An example of such could be implemented in a smart home setup. In the smart home there can be several sensors deployed in the smart home. The consumer, in this example, is interested in having each sensor report the sensed value every thirty minutes. Each notification of value changes acts as a chargeable event for an IoT service provider.

Figure 1:
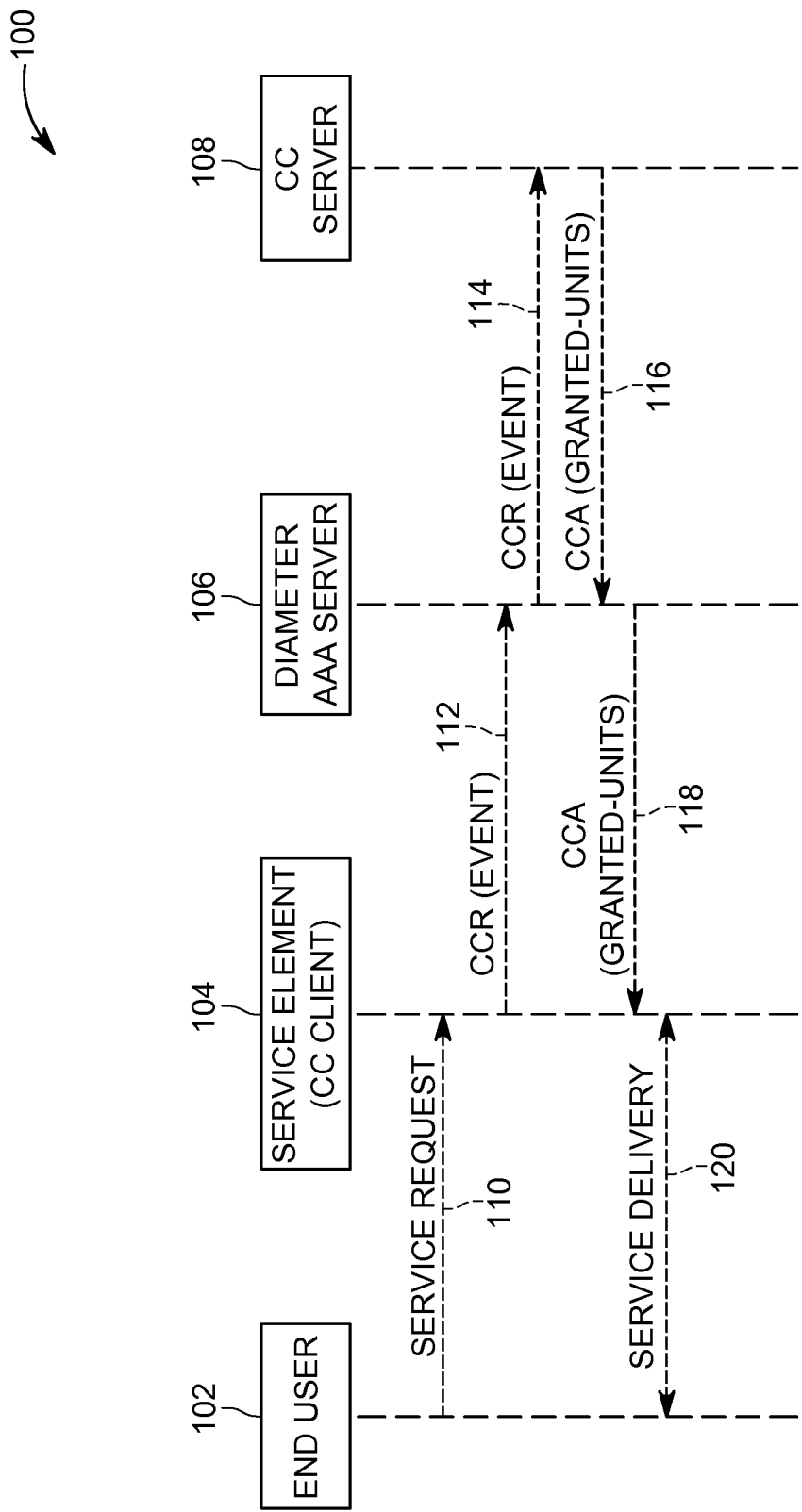
FIG. 1 illustrates a one-time event based charging signaling diagram.

As described in the Background Section associated with FIG. 1, a single one-time event charging signaling process exists, however, this process is not efficient in an IoT environment. Instead, embodiments described herein use the relationship in which the IoT service layer 206 can be aware via prediction, deduction, predetermined instructions or other means, of the time and quantity of notifications that will likely be generated by an IoT device 210a, 210b and/or 210c to optimize signaling between the IoT service layer 206 and the OCS 208. An example of this optimization will now be described with respect to the signaling diagram 300 shown in FIG. 3.

Figure 3:
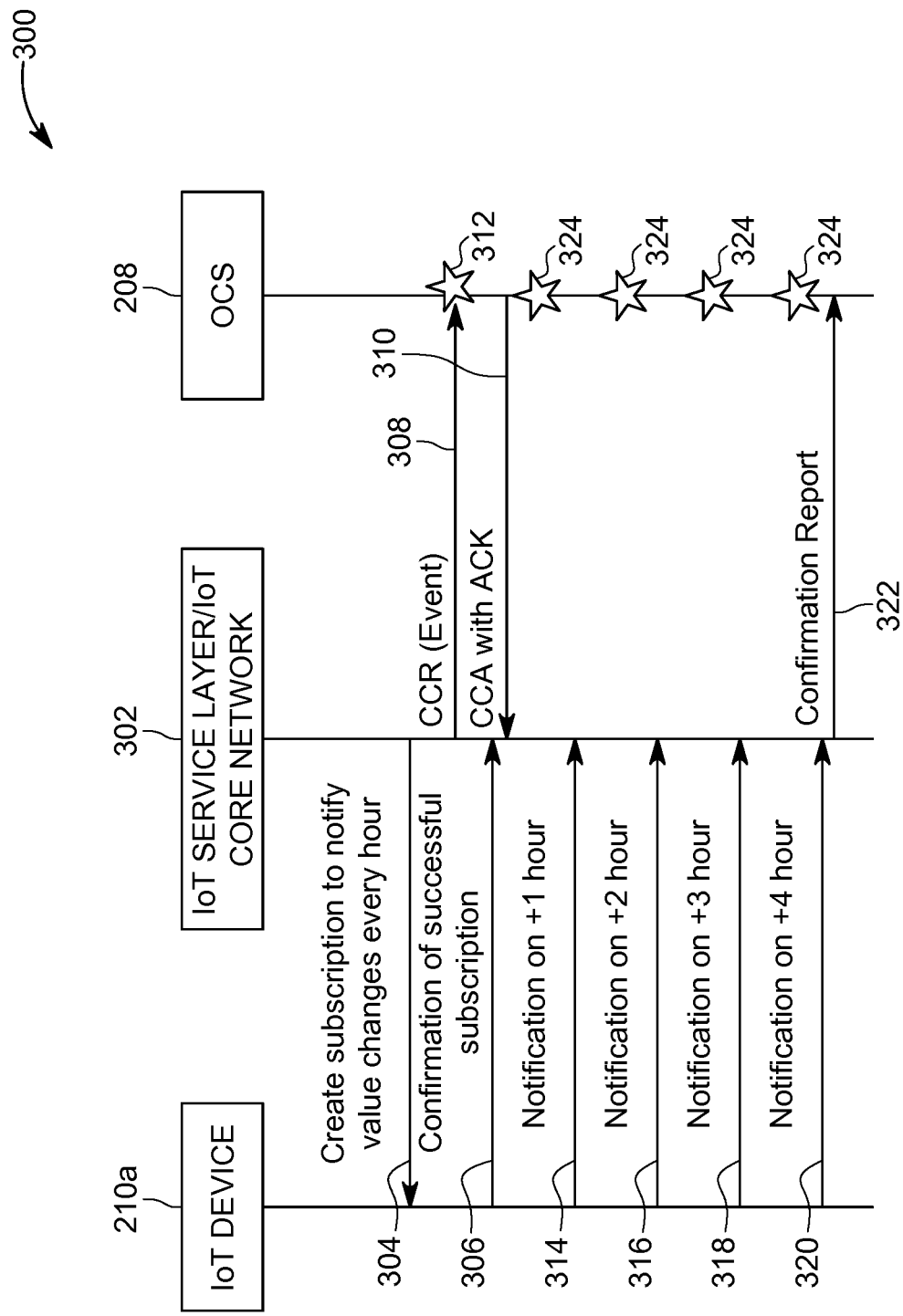
FIG. 3 depicts a signaling diagram for communications in an IoT environment according to an embodiment.

According to an embodiment, FIG. 3 shows a signaling diagram 300 for communications in an IoT environment for the IoT device 210a for which a subscription including multiple event notifications is created. In FIG. 3, there is the IoT device 210a, an IoT block 302 which represents both the IoT service layer 206 and the IoT core network 204, and the OCS 208. Initially, a subscription is created to notify value changes every hour for IoT device 210a by the IoT block 302 (which generally means created by the IoT service layer 206 and transmitted via the IoT core network 204) and transmitted to the IoT device 210a as shown in message 304. In this example, the subscriptions are created to report the temperature value of a sensor associated with the IoT device 210a every hour and five times, i.e., the temperature value is to be reported for the next five hours once per hour by the IoT device 210a. The notifications that are generated by the IoT device 210a towards the IoT service layer 206 are considered as chargeable events.

The IoT device 210a confirms the successful subscription in message 306 to the IoT block 302. The IoT block 302 (in this case the IoT service layer 206) transmits a Credit Control Request (CCR) message 308 including an event with enriched information on the periodic consumption that is planned for the IoT device 210 to the OCS 208. The OCS 208 responds with a Credit Control Answer (CCA) message 310, e.g., an ACK message, acknowledging the handling of the request and also suggesting the time at which the OCS 208 is expecting a confirmation.

Star 312 represents the OCS 208's ability to, according to one embodiment, store the plurality of anticipated, chargeable events indicated by the single CCR (Event) signal 308, and to execute them in a timely manner to then periodically deduct units from the subscriber's account. Stars 324 represent these periodic future deductions at the future expected event times. As these events actually occur, the IoT device 210a transmits notification message at the predetermined times, e.g., each hour, as shown by messages 314, 316, 318 and 320. However, it can be seen in FIG. 3 that the actual event notifications 314, 316, 318 and 320 do not result in additional CCR (Event) signals being transmitted to OCS 208

As an alternative to enabling the OCS 208 to predict, based on the information provided in CCR (Event) message 308, when the chargeable events are predicted to occur and to then charge the subscribers account at those times 324, the OCS 208 could instead deduct (or reserve) an amount which corresponds to the total number of chargeable events which are expected to occur. Such deduction (or reservation) toward the subscriber's account can occur at any time, e.g., immediately after receipt of the CCR (Event) signal 308 or at some predetermined time thereafter.

Upon completion of the events associated with this subscription, a confirmation report message 322 is transmitted from the IoT service layer 206 represented by the IoT block 302 to the OCS 208. This confirmation message is a report which captures all of the actual event notifications 314-320 received during a specific period of time. The OCS 208 can correlate the notifications received against the deductions performed on the subscriber's account in terms of number, time of the notification, etc. In case of any discrepancies, appropriate correction can be performed by the OCS 208 through refunds, further deductions and the like. For example, a missing notification could be corrected on the account in the form of a refund to the account.

According to an embodiment, using the above signaling process the interface between the IoT service layer 206, as well as an IoT access network (which for the purposes of the embodiments described herein is represented by the IoT Core Network 204), and the OCS 208, is improved as the signaling process is established before the consumption pattern occurs. Thus, there is no charging signaling required at the time of the actual notifications, i.e., the amount of overall signaling is reduced. Additionally, this process can also establish ahead of time if the subscriber has enough funds in their account to support future service consumption by the IoT device owned by the subscriber.

According to an alternate embodiment, the initial CCR message (Event) 308 could include additional information that assists with separate charging for IoT service layer 206 parameters and IoT core network 204 usage.

According to an embodiment, there can be scenarios where the IoT device 210a does not follow the periodic notification pattern, e.g., when a threshold is reached, and notifies the IoT service layer 206 about the value changes. The IoT service 206 layer can then send an additional CCR message to treat this occurrence as an event based charging occurrence. Alternatively, the confirmation report message can describe this issue for the OCS 208 to resolve.

Figure 4:
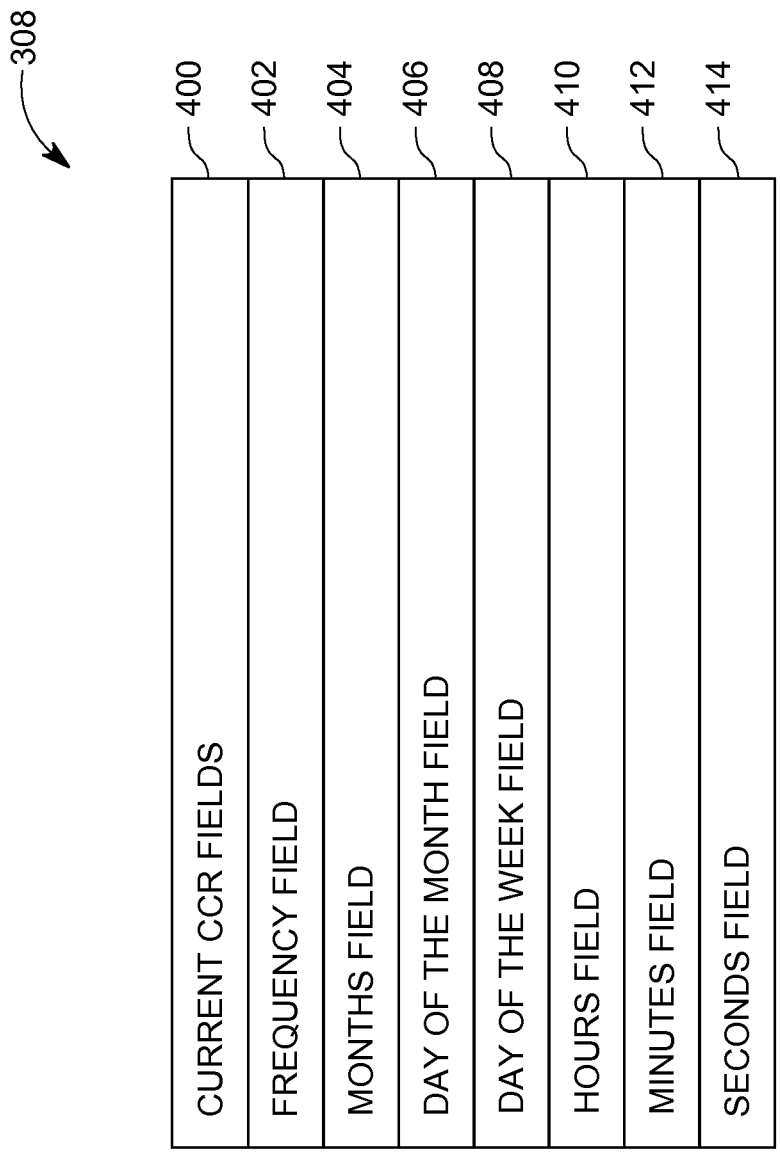
FIG. 4 shows a modified Credit Control Request (CCR) message according to an embodiment.

As described above, there is a CCR message 308 with information regarding the subscription for the IoT device 210a. As the CCR message 308 includes information regarding periodicity over time for the chargeable notifications, according to an embodiment, the CCR message 308 can include new fields. An example of this novel CCR message 308 is shown in FIG. 4. According to an embodiment, FIG. 4 shows the CCR message 308 which includes current CCR fields 400, a Frequency field 402, a Months field 404, a Day of the Month field 406, a Day of the week field 408, an Hours field 410 a Minutes field 412 and a Seconds field 414. These fields are described in more detail below with respect to Table 1.

TABLE 1

| | |
|---|---|
| Frequency | This field specifies the type of recurrence. Frequency values can be monthly, weekly, daily, hourly, minutely and secondly. |
| Months | This field specifies the month or months of the year. Valid values are 1 to 12.<br>It is possible to provide multiple months in a year. That is, the notification events can occur multiple times per year. |

TABLE 1-continued

| | |
|---|---|
| Day of the month | This field specifies the day of the month. Valid values are 1 to 31. For example, Day of the month = 10 means the 10$^{th}$ day of the selected month.<br>It is possible to specify multiple days in a month. That is, the notification activation events can occur multiple times per month. |
| Day of the week | This field specifies the day of the week.<br>Day of the week is used only with the weekly frequency.<br>It is possible to select multiple days in a week. That is, the notification events can occur multiple times per week. |
| Hours | This field specifies the hour. Valid values are 0 to 23. For example, the value 10 means 10 A.M.<br>If the value of hours is not explicitly configured, the value is picked from the first reserve for notification. |
| Minutes | This field specifies the minutes. Valid values are 0 to 59. For example, the value 45 means 45 minutes past the chosen hour.<br>If the value of minutes is not explicitly configured, the value is picked from the first reserve for notification. |
| Seconds | This field specifies the seconds. Valid values are 0 to 59. For example, the value 30 means 30 seconds past the chosen minute.<br>If the value of seconds is not explicitly configured, the value is picked from the first reserve for notification (auto-provisioning). |

While Table 1 shows new fields added to a currently used CCR message, it is understood that similar fields could be incorporated in equivalent messages used, for example, in a 5$^{th}$ generation system.

Figure 5:
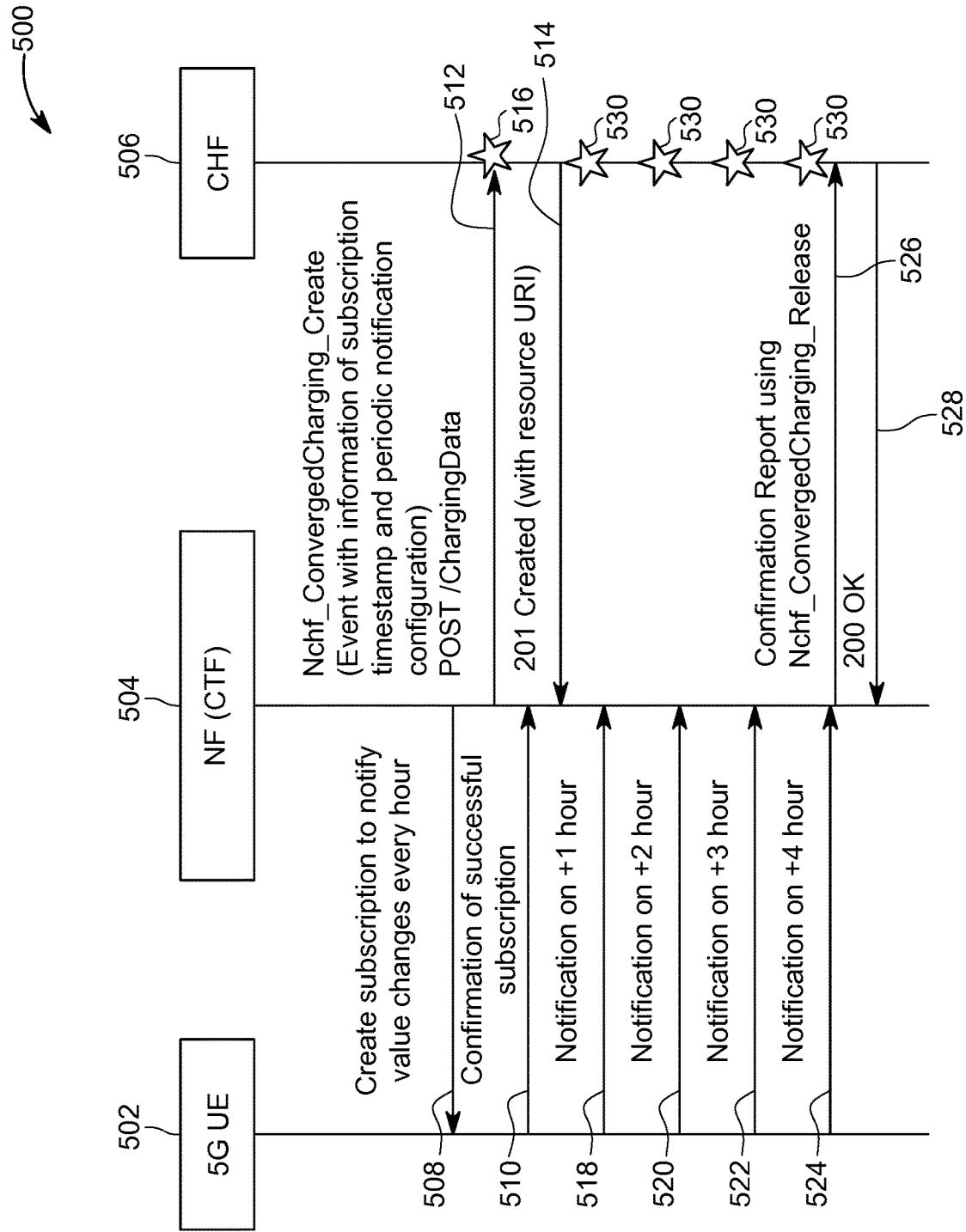
FIG. 5 shows a signaling diagram for communications in an IoT environment using 5th generation nodes and/or devices according to an embodiment.

As described above, FIG. 3 shows a signaling diagram 300 for communications in an IoT environment for the IoT device 210a for which a subscription including multiple notifications is created. FIG. 5 shows a similar signaling diagram 500 utilizing nodes expected to be used in a 5G environment.

According to an embodiment, FIG. 5 shows a signaling diagram 500 for communications in an IoT environment for a 5G UE 502 for which a subscription including multiple notifications is created. In FIG. 5, there is the 5G UE 502, a network function (NF) which has an associated charging trigger function (CTF) 504 which performs the equivalent functions of the IoT service layer 206 and the IoT core network 204, and a charging function (CHF) 506. Initially, a subscription is created to notify value changes every hour for the 5G UE 502 by the CTF 504 and transmitted to the 5G UE 502 as shown in message 508. In this example, the subscriptions are created to report the temperature value of a sensor associated with the 5G UE 502 every hour and five times, i.e., the temperature value is to be reported for the next five hours once per hour by the 5G UE 502. The notifications that are generated by the 5G UE 502 towards the CTF 504 are considered as chargeable events.

The 5G UE 502 confirms the successful subscription in message 510 to the CTF 504. The CF 504 transmits a modified Nchf_ConvergedCharging_Create message 512 including an event with information on the periodic consumption that is planned for the 5G UE 502 to the CHF 506. The CHF 506 responds with a 201 Created message 514 which includes a resource Uniform Resource Identifier (URI), acknowledging the handling of the request and also suggesting the time at which the CHF 506 is expecting a confirmation Star 516 represents the CHF 506's ability to, according to an embodiment, store the plurality of anticipated, chargeable events indicated by the single modified Nchf_ConvergedCharging_Create message 512, and to execute them in a timely manner to then periodically deduct units from the subscriber's account. Stars 530 represent these periodic future deductions at the future expected event times. As these events actually occur, the 5G UE 502 transmits notification message at the predetermined times, e.g., each hour, as shown by messages 518, 520, 522 and 524. However, it can be seen in FIG. 3 that the actual event notifications 314, 316, 318 and 320 do not result in additional CCR (Event) signals being transmitted to OCS 208

As an alternative to enabling the OCS 208 to predict, based on the information provided in modified Nchf_ConvergedCharging_Create message 512, when the chargeable events are predicted to occur and to then charge the subscribers account at those times 530, the OCS 208 could instead deduct (or reserve) an amount which corresponds to the total number of chargeable events which are expected to occur. Such deduction (or reservation) toward the subscriber's account can occur at any time, e.g., immediately after receipt of the modified Nchf_ConvergedCharging_Create message 512 or at some predetermined time thereafter.

Upon completion of the events associated with this subscription, a confirmation report message 526, e.g., Nchf_ConvergedCharging_Release message, is transmitted from the NF (CTF) 504 to the CHF 506. This confirmation message is a report which captures all of the actual event notifications 518-524 received during a specific period of time. The CHF 506 can correlate the notifications received against the deductions performed on the subscriber's account in terms of number, time of the notification, etc. In case of any discrepancies, appropriate correction can be performed by the CHF 506 through refunds, further deductions and the like. For example, a missing notification could be corrected on the account in the form of a refund to the account.

According to an embodiment, rules, deployed as rules objects, can also be used (or alternatively used) to allow for conditional charging decision(s) to be used in some IoT scenarios. For example, one or more Rule Objects can be provisioned towards the OCS 208 to allow conditional charging decisions to be taken based upon time and location, or a combination of both time and location. There can be one or more rules for reservation/debit that are executed based on priority at the OCS 208. A decision object may also be used towards the OCS 208 to have variations in the manner various charging components are executed, e.g., the decision object could be configured to only execute a reserve module for the first three such instances and debit from a fourth instance onwards associated with an event notification or expected event notification.

Figure 6:
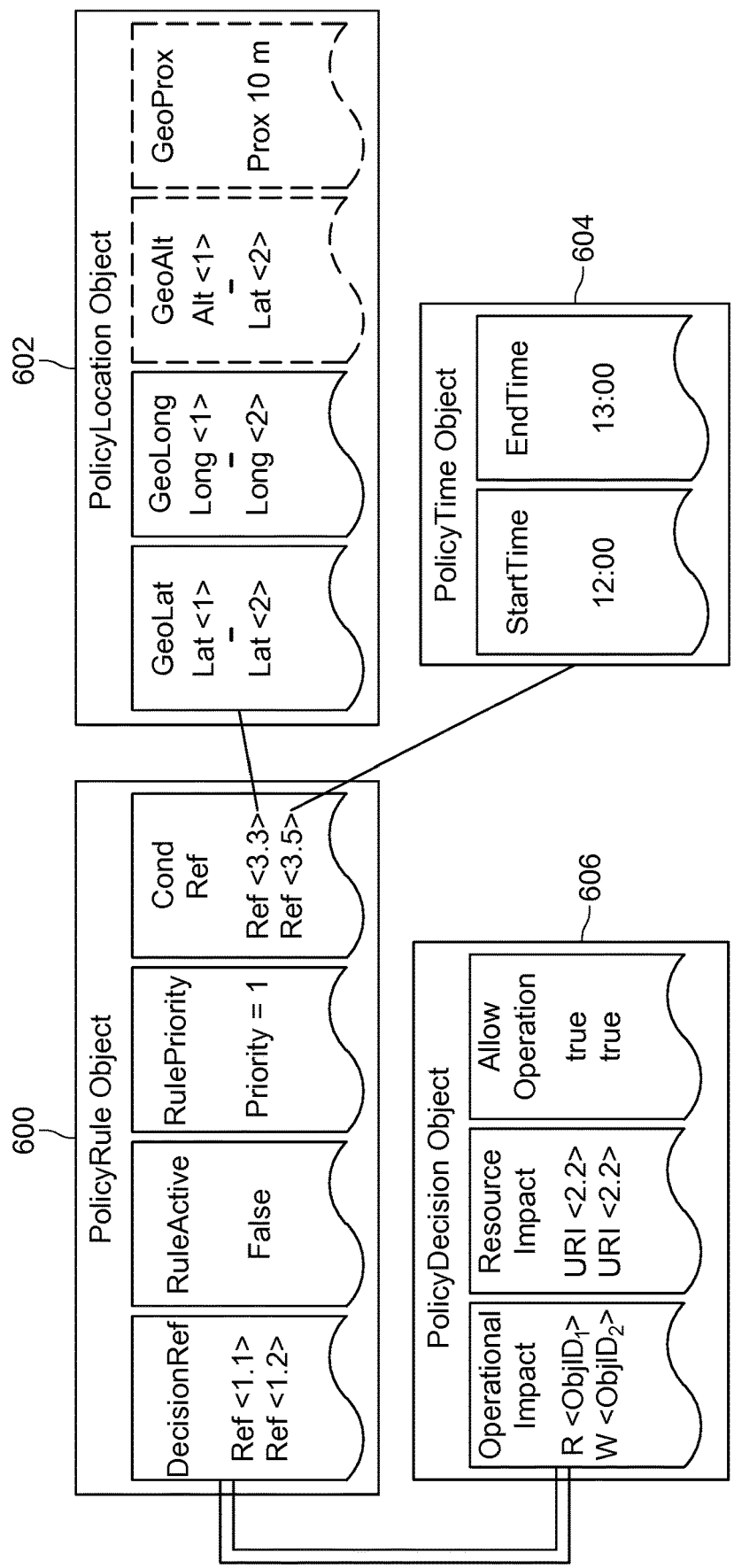
FIG. 6 depicts a plurality of policy objects according to an embodiment.

An overview illustrating how different described objects and their resources may be mutually linked to each other, so that required policies can be provisioned, in support of IoT event notifications and charging signaling, are now described with respect to FIG. 6. As indicated in FIG. 6, conditional references (CondRef) includes one reference to a PolicyLocation object 602, defining where geographically a policy is to be applicable, and one PolicyTime object 604, defining when in time the policy is to be applied. The PolicyRule object 600 has also been set, in this example, to a high priority (e.g., priority=1) which will guarantee that when the conditions set in the other objects are fulfilled the specified policy, which is presently set to "false" in the RuleActive resource will be executed. The DecisionRef resource comprises two references to an OperationalImpact resource in a PolicyDecision object 606, and more specifically to two different operations, namely a read operation followed by a write operation which can be associated with information used to assist IoT charging decisions or implementation.

According to an embodiment, when a referencing-based approach is used, for example using Time object, an operator can provision only one such object and re-use it in several configurations to formulate a more complex reservation/deduction logic. For example, the operator can provision three Time objects in the OCS 208 as follows:

Time object 1: Execute 01:00-05:00 every hour
Time object 2: Execute 09:00-11:00 every 20 minutes
Time object 3: Execute 17:00-21:00 every 30 minutes The operator can use a combination of all three objects to create a more complex reservation/deduction logic that requires much less signaling from the network side and still provide re-usability in several such rule logics.

Figure 7:
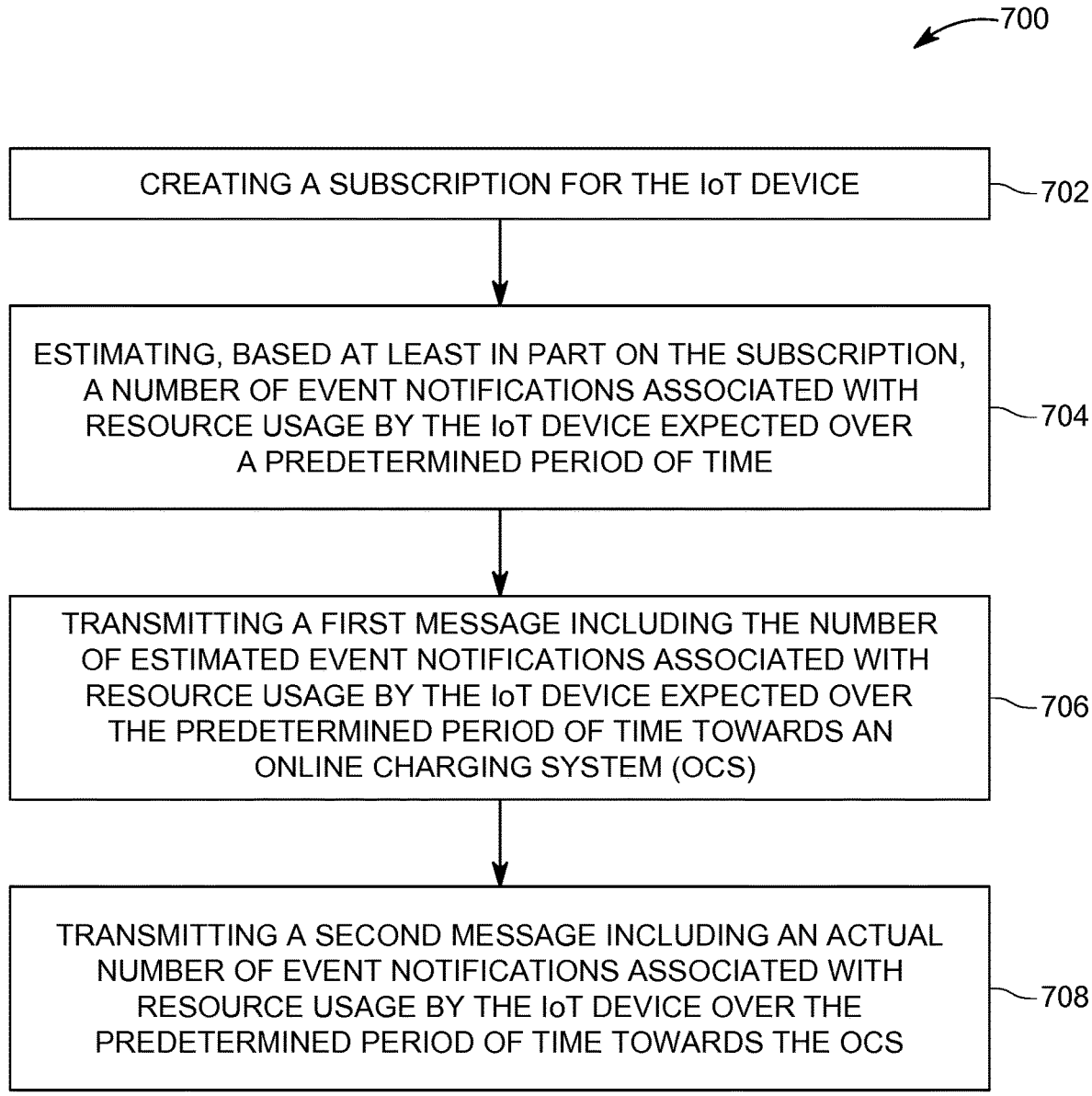
FIG. 7 shows a flowchart of a method for charging for resource usage by an IoT device according to an embodiment.

According to an embodiment, there is a method 700 for charging for resource usage by an IoT device as shown in FIG. 7. The method includes: in step 702, creating a subscription for the IoT device; in step 704, estimating, based at least in part on the subscription, a number of event notifications associated with resource usage by the IoT device expected over a period of time; in step 706, transmitting a first message including the number of estimated event notifications associated with resource usage by the IoT device expected over the period of time towards an Online Charging System (OCS); and in step 708, transmitting a second message including an actual number of event notifications associated with resource usage by the IoT device over the period of time towards the OCS.

Figure 8:
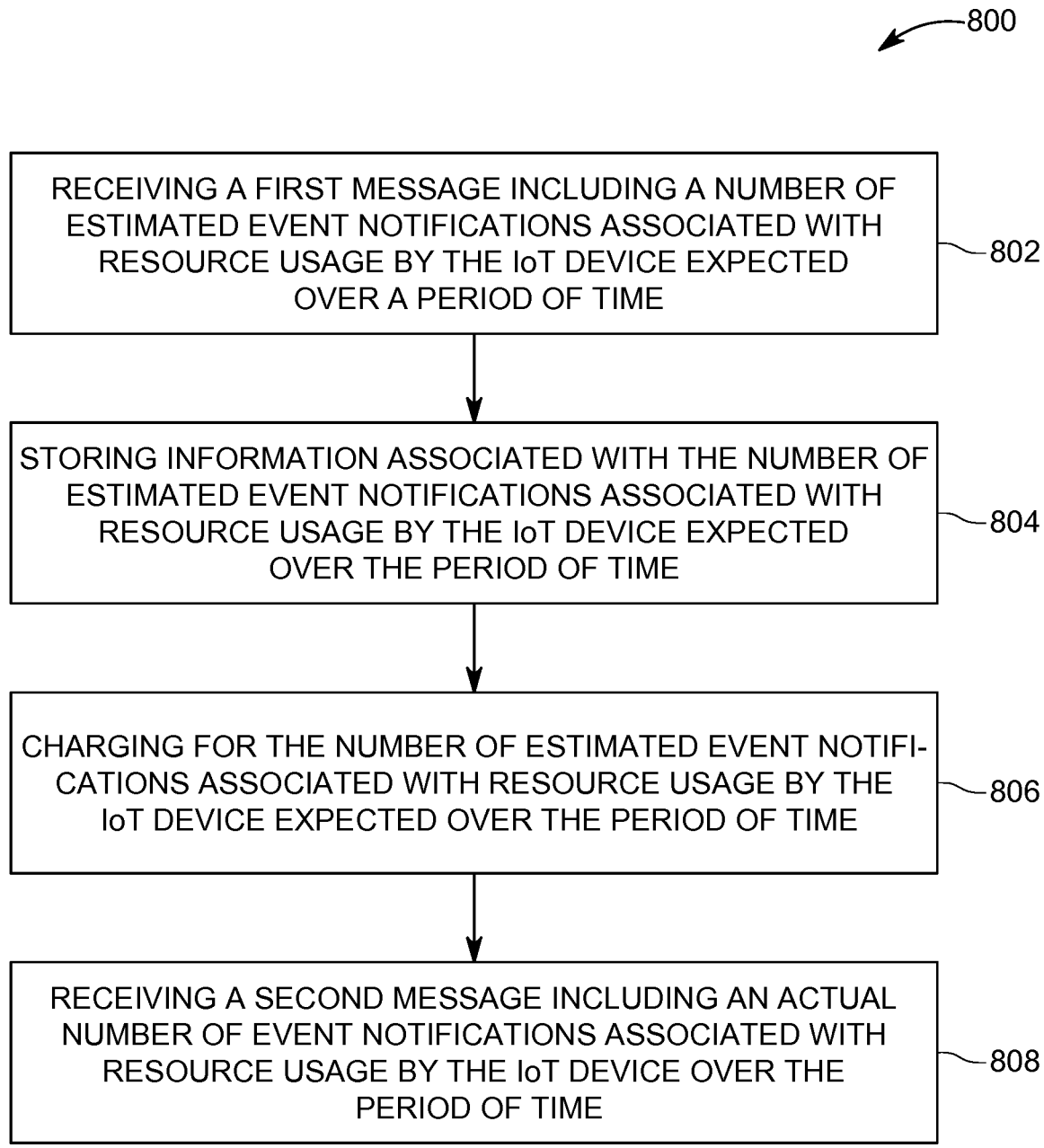
FIG. 8 illustrates a flowchart of another method for charging for resource usage by an IoT device according to an embodiment.

According to an embodiment, there is a method 800 for charging for resource usage of an IoT device, wherein the charging is performed by an OCS, as shown in FIG. 8. The method includes: in step 802, receiving a first message including a number of estimated event notifications associated with resource usage by the IoT device expected over a period of time; in step 804, storing information associated with the number of estimated event notifications associated with resource usage by the IoT device expected over the period of time; in step 806, charging for the number of estimated event notifications associated with resource usage by the IoT device expected over the period of time; and in step 808, receiving a second message including an actual number of event notifications associated with resource usage by the IoT device over the period of time.

Figure 9:
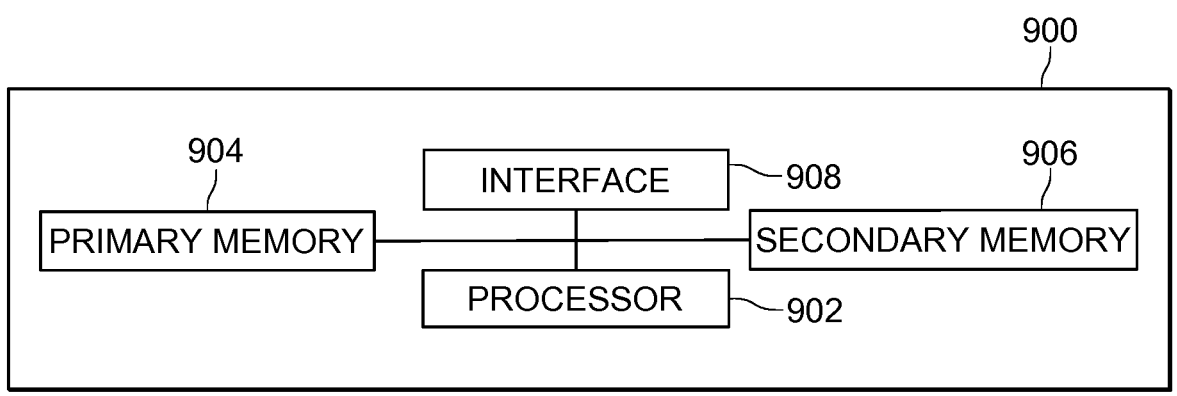
FIG. 9 depicts a communication node according to an embodiment.

Embodiments described above can be implemented in one or more nodes (or servers). An example of a communication node 900 is shown in FIG. 9. The communication node 900 (or other network node) includes a processor 902 for executing instructions and performing the functions described herein, e.g., the functions an IoT device 210a, a 5G UE 502, other nodes shown in the various Figures and the OCS 208. The communication node 900 also includes a primary memory 904, e.g., random access memory (RAM) memory, a secondary memory 906 which can be a non-volatile memory, and an interface 908 for communicating with other portions of a network or among various nodes/servers in support of mid-call announcements.

Processor 902 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other communication node 900 components, such as memory 904 and/or 906, server 900 functionality. For example, processor 902 may execute instructions stored in memory 904 and/or 906.

Primary memory 904 and secondary memory 906 may comprise any form of volatile or non-volatile computer readable memory including, without limitation, persistent storage, solid state memory, remotely mounted memory, magnetic media, optical media, RAM, read-only memory (ROM), removable media, or any other suitable local or remote memory component. Primary memory 904 and secondary memory 906 may store any suitable instructions, data or information, including software and encoded logic, utilized by node 900. Primary memory 904 and secondary memory 906 may be used to store any calculations made by processor 902 and/or any data received via interface 908.

Communication node 900 also includes interface 908 which may be used in the wired or wireless communication of signaling and/or data. For example, interface 908 may perform any formatting, coding, or translating that may be needed to allow communication node 900 to send and receive data over a wired connection. Interface 908 may also include a radio transmitter and/or receiver that may be coupled to or a part of the antenna. The radio may receive digital data that is to be sent out to other network nodes or wireless devices via a wireless connection. The radio may convert the digital data into a radio signal having the appropriate channel and bandwidth parameters. The radio signal may then be transmitted via an antenna to the appropriate recipient.

According to embodiments, the systems and methods described herein can optimize signaling in IoT environments. More specifically, logic associated with reservations and account deduction can be optimized as one or more patterns are created based on upcoming usage by an IoT device (210a, 210b and/or 210c). This can result in a reduced signaling amount which is a savings of network and OCS 208 resources, particularly in the expected high volume of IoT devices. Embodiments also simplify and optimize flows and interfaces, e.g., signaling can be only required when charging rules are created, updated, deleted or when any out of order service consumption occurs. Some embodiments additionally allow for using existing infrastructure of telecommunication operators to act as an IoT network and/or IoT service provider.

The disclosed embodiments provide methods and systems associated with charging for resource usage by IoT devices. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 10:
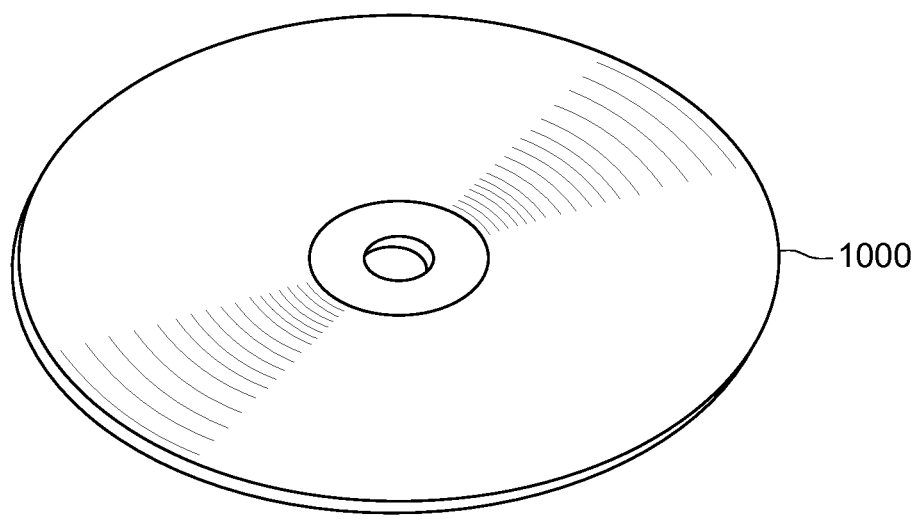
FIG. 10 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments describe herein, e.g., systems and methods associated with charging in an IoT environment, may take the form of a computer program product stored on a computer-readable storage medium having computer-readable instructions embodied in the medium. For example, FIG. 10 depicts an electronic storage medium 1000 on which computer program embodiments can be stored. Any suitable computer-readable medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for charging for resource usage by an Internet of Things (IoT) device, the method comprising:
    creating a subscription for the IoT device;
    estimating, based at least in part on the subscription, a number of event notifications associated with resource usage by the IoT device expected over a period of time;
    transmitting a first message including the number of estimated event notifications associated with resource usage by the IoT device expected over the period of time towards an Online Charging System (OCS); and
    transmitting a second message including an actual number of event notifications associated with resource usage by the IoT device over the period of time towards the OCS.

2. The method of claim 1 wherein the second message also includes event notifications associated with resource usage by the IoT device outside of the period of time.

3. The method of claim 1, wherein the method for charging for resource usage the IoT device occurs in a node associated with an IoT Service Layer.

4. The method of claim 1, wherein the first message is either a modified Credit Charging Request (CCR) message or a modified Nchf_ConvergedCharging_Create message, wherein the first message includes at least one of a frequency field, a months field, a day of the month field, a day of the week field, an hours field, a minutes field and a seconds field.

5. The method of claim 1, wherein the IoT device is a smart device with a transmitter and at least one sensor.

6. The method of claim 1, wherein the IoT device is a $5^{th}$ generation user equipment (UE).

7. A communication node for charging for resource usage by an Internet of Things (IoT) device, the communication node comprising:
    a processor configured to create a subscription for the IoT device;
    the processor configured to estimate, based at least in part on the subscription, a number of event notifications associated with resource usage by the IoT device expected over a period of time;
    a communication interface configured to transmit a first message including the number of estimated event notifications associated with resource usage by the IoT device expected over the period of time towards an Online Charging System (OCS); and
    the communication interface configured to transmit a second message including an actual number of event notifications associated with resource usage by the IoT device over the period of time towards the OCS.

8. The communication node of claim 7 wherein the second message also includes event notifications associated with resource usage by the IoT device outside of the period of time.

9. The communication node of claim 7, wherein the communication node is a part of an IoT Service Layer.

10. The communication node of claim 7, wherein the first message is either a modified Credit Charging Request (CCR) message or a modified Nchf_ConvergedCharging_Create message, wherein the first message includes at least one of a frequency field, a months field, a day of the month field, a day of the week field, an hours field, a minutes field and a seconds field.

11. The communication node of claim 7, wherein the IoT device is a smart device with a transmitter and at least one sensor.

12. The communication node of claim 7, wherein the IoT device is a $5^{th}$ generation user equipment (UE).

13. A method for charging for resource usage of an Internet of Things (IoT) device, wherein the charging is performed by an Online Charging System (OCS), the method comprising:
    receiving a first message including a number of estimated event notifications associated with resource usage by the IoT device expected over a period of time;
    storing information associated with the number of estimated event notifications associated with resource usage by the IoT device expected over the period of time;
    charging for the number of estimated event notifications associated with resource usage by the IoT device expected over the period of time; and
    receiving a second message including an actual number of event notifications associated with resource usage by the IoT device over the period of time.

14. The method of claim 13, further comprising:
    when the OCS receives the first message and stores the received estimated number of event notifications, charging a subscriber account associated with the IoT device at an estimated time at which the OCS determines that an unsent event notification message, associated with one of the estimated number of event notifications, would have been received.

15. The method of claim 13, further comprising:
    when the OCS receives the first message and charges or reserves a subscriber account associated with the IoT device for all of the estimated event notifications at a single time.

16. The method of claim 13, further comprising:
    reconciling differences between the number of estimated event notifications and the actual number of event notifications after receiving the second message.

17. An Online Charging System (OCS) node configured to charge for resource usage of an Internet of Things (IoT) device, the OCS node comprising:
    a communication interface configured to receive a first message including a number of estimated event notifications associated with resource usage by the IoT device expected over a period of time;
    a memory configured to store information associated with the number of estimated event notifications associated with resource usage by the IoT device expected over the period of time;
    a processor configured to charge for the number of estimated event notifications associated with resource usage by the IoT device expected over the period of time; and
    the communication interface configured to receive a second message including an actual number of event notifications associated with resource usage by the IoT device over the period of time.

18. The OCS node of claim 17, wherein when the OCS receives the first message and stores the received estimated number of event notifications, charging a subscriber account associated with the IoT device at an estimated time at which the OCS determines that an unsent event notification message, associated with one of the estimated number of event notifications, would have been received.

19. The OCS node of claim 18, wherein when the OCS receives the first message and charges or reserves a subscriber account associated with the IoT device for all of the estimated event notifications at a single time.

20. The OCS node of claim 17, further comprising:
   the processor configured to reconcile differences between the number of estimated event notifications and the actual number of event notifications after receiving the second message.

21. A non-transitory machine-readable storage medium containing a computer-readable code that when read by a processor causes the processor to charge for resource usage of an Internet of Things (IoT) device, wherein the charging is performed by an Online Charging System (OCS), comprising:
   receiving a first message including a number of estimated event notifications associated with resource usage by the IoT device expected over a period of time;
   storing information associated with the number of estimated event notifications associated with resource usage by the IoT device expected over the period of time;
   charging for the number of estimated event notifications associated with resource usage by the IoT device expected over the period of time; and
   receiving a second message including an actual number of event notifications associated with resource usage by the IoT device over the period of time.

* * * * *